United States Patent
Ofek et al.

(10) Patent No.: US 10,416,769 B2
(45) Date of Patent: Sep. 17, 2019

(54) PHYSICAL HAPTIC FEEDBACK SYSTEM WITH SPATIAL WARPING

(71) Applicant: Microsoft Technology Licensing, LLC, Redmond, WA (US)

(72) Inventors: Eyal Ofek, Redmond, WA (US); Andrew Wilson, Seattle, WA (US); Hrvoje Benko, Seattle, WA (US); Christian Holz, Seattle, WA (US); Lung-Pan Cheng, Berlin (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 228 days.

(21) Appl. No.: 15/432,878

(22) Filed: Feb. 14, 2017

(65) Prior Publication Data
US 2018/0232050 A1    Aug. 16, 2018

(51) Int. Cl.
G06F 3/01    (2006.01)
G06T 3/00    (2006.01)
G02B 27/01    (2006.01)

(52) U.S. Cl.
CPC ........... *G06F 3/016* (2013.01); *G02B 27/017* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS 7,526,322 B2    4/2009    Whistler
9,067,097 B2    6/2015    Lane et al.
(Continued)

FOREIGN PATENT DOCUMENTS

WO    0221451 A1    3/2002
WO    2015192117 A1    12/2015

OTHER PUBLICATIONS

"Near Real-Time Logs (nRTL)—SharePoint Online Dedicated vNext", Microsoft Website, https://www.microsoft.com/en-us/, Available as early as Oct. 8, 2015, Retrieved on Feb. 13, 2016, 18 pages.
(Continued)

*Primary Examiner* — Chad M Dicke
(74) *Attorney, Agent, or Firm* — Alleman Hall Creasman & Tuttle LLP

(57) ABSTRACT

A computing system including a head mounted display device with a processor and an associated display is provided. A sensor in communication with the processor is configured to detect a movable body part of a user. A plurality of physical haptic feedback structures are configured to be contacted by the movable body part. The processor is configured to operate the display device, receive data from the sensor, and determine an intended virtual target of the movable body part and a target physical structure having haptic characteristics corresponding to the intended virtual target. Also, the processor is configured to compute a path in real three-dimensional space from the movable body part to the target physical structure, compute a spatial warping pattern, and display via the display the virtual space and the virtual reality representation according to the spatial warping pattern.

20 Claims, 8 Drawing Sheets

(52) U.S. Cl.
CPC ...... *G06T 3/0093* (2013.01); *G02B 2027/014* (2013.01); *G02B 2027/0187* (2013.01); *G06F 2203/014* (2013.01)

(56) References Cited

U.S. PATENT DOCUMENTS

| | | | |
|---|---|---|---|
| 9,392,212 B1 | 7/2016 | Ross | |
| 10,008,038 B2* | 6/2018 | Miller | G06F 3/011 |
| 10,055,893 B2* | 8/2018 | Fradet | G06T 17/10 |
| 10,070,120 B2* | 9/2018 | Pedley | G02B 27/0172 |
| 10,134,191 B2* | 11/2018 | Reagan | G06T 19/006 |
| 2003/0020707 A1* | 1/2003 | Kangas | G06F 3/011 |
| | | | 345/418 |
| 2005/0052415 A1* | 3/2005 | Braun | G06F 3/016 |
| | | | 345/161 |
| 2007/0035562 A1* | 2/2007 | Azuma | G03B 13/28 |
| | | | 345/633 |
| 2010/0128112 A1* | 5/2010 | Marti | G06F 3/011 |
| | | | 348/51 |
| 2010/0198730 A1 | 8/2010 | Ahmed et al. | |
| 2012/0113223 A1* | 5/2012 | Hilliges | G06F 3/00 |
| | | | 348/46 |
| 2012/0142415 A1* | 6/2012 | Lindsay | G06T 19/006 |
| | | | 463/33 |
| 2012/0194553 A1* | 8/2012 | Osterhout | G02B 27/0093 |
| | | | 345/633 |
| 2013/0083008 A1* | 4/2013 | Geisner | G06T 19/006 |
| | | | 345/419 |
| 2014/0071165 A1* | 3/2014 | Tuchschmid | G06T 19/006 |
| | | | 345/633 |
| 2015/0186668 A1 | 7/2015 | Whaley et al. | |
| 2015/0338915 A1* | 11/2015 | Publicover | G06F 21/64 |
| | | | 345/633 |
| 2016/0012643 A1* | 1/2016 | Kezele | G06T 19/006 |
| | | | 345/633 |
| 2016/0085305 A1 | 3/2016 | Spio | |
| 2016/0267720 A1* | 9/2016 | Mandella | G06T 19/006 |
| 2016/0275722 A1 | 9/2016 | Bretschneider et al. | |
| 2016/0299563 A1 | 10/2016 | Stafford et al. | |
| 2017/0050113 A1* | 2/2017 | Mullen | A63F 13/25 |
| 2017/0109933 A1* | 4/2017 | Voorhees | G06F 17/2241 |
| 2017/0200313 A1* | 7/2017 | Lee | G06T 19/006 |
| 2017/0287218 A1* | 10/2017 | Nuernberger | G06T 19/006 |
| 2017/0337839 A1* | 11/2017 | Yudofsky | G09B 5/00 |
| 2018/0032125 A1* | 2/2018 | Peterson | G06F 3/013 |

OTHER PUBLICATIONS

"Near Real-Time Logs (nRTL)—Exchange Online", Microsoft Website, https://www.microsoft.com/en-us/, Available as early as Dec. 27, 2015, Retrieved on Feb. 13, 2016, 16 pages.

"Real-time Processing of Log Data with Subscriptions", Amazon Website, Available Online at http://docs.aws.amazon.com/AmazonCloudWatch/latest/DeveloperGuide/Subscriptions.html, Available as Early as Jun. 9, 2015, 13 pages.

"Microsoft.Online.SharePoint.SPLogger namespace", Microsoft Website, Available Online at https://msdn.microsoft.com/EN-US/library/office/microsoft.online.sharepoint.splogger.aspx, Available as early as Feb. 13, 2016, 1 page.

"Near Real-Time Log Sync Solution Brief", Blue Coat Systems Website, Available Online at https://bto.bluecoat.com/sites/default/files/tech_pubs/PDF_SyncAPI.pdf, Available as early as Oct. 30, 2015, 16 pages.

"NetScout nGenius Real-Time Monitor™ 1.4 Getting Started Guide", NetScout Website, Available Online at https://www.cisco.com/application/pdf/en/us/guest/products/ps4743/c1689/ccmigration_09186a00800ab791.pdf, Available as Early as Jun. 10, 2003, 72 pages.

Richter W., et al., "Agentless Cloud-wide Streaming of Guest File System Updates", In Proceedings of IEEE International Conference on Cloud Engineering, Mar. 11, 2014, Boston, Massachusetts, 10 pages.

Carvalheiro, et al., "User Redirection and Direct Haptics in Virtual Environments", In Proceedings of the ACM on Multimedia Conference, Oct. 15, 2016, pp. 1146-1155.

Steinicke, et al., "Taxonomy and Implementation of Redirection Techniques for Ubiquitous Passive Haptic Feedback", In Proceedings of IEEE International Conference on Cyberworlds, Sep. 22, 2008, 7 pages.

Sra, et al., "MetaSpace II: Object and full-body tracking for interaction and navigation in social VR", In Journal of the Computing Research Repository, Dec. 2015, 10 pages.

Walker, et al., "Tactile Feedback of Object Slip Facilitates Virtual Object Manipulation", In Journal of IEEE transactions on haptics, vol. 8, Issue 4, Oct. 2015, pp. 1-15.

Ruspini, et al., "Haptic Interaction in Virtual Environments", In Proceedings of the International Conference on Intelligent Robots and Systems, Sep. 1997, 6 pages.

Perez, et al., "Optimization-Based Wearable Tactile Rendering", In Journal of IEEE Transactions on Haptics, vol. PP, Issue 99, Oct. 20, 2016, pp. 1-11.

Gosselin, et al., "Analysis of the Directions in which Forces are Applied on the Hand During Manual Manipulation and Exploration", In Proceedings of IEEE World Haptics Conference, Jun. 22, 2015, pp. 280-285.

Kohli, Luv, "Redirected Touching: Warping Space to Remap Passive Haptics", The University of North Carolina at Chapel Hill, Mar. 20, 2010. 2 pages.

* cited by examiner

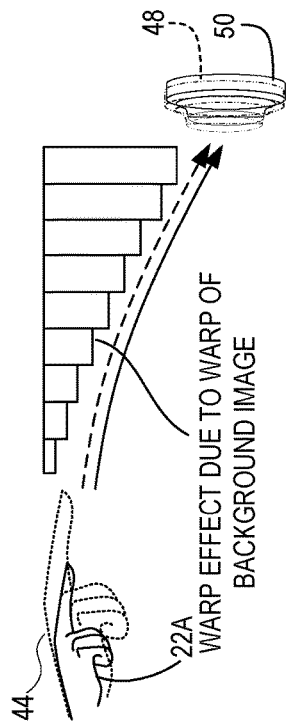
FIG. 3A
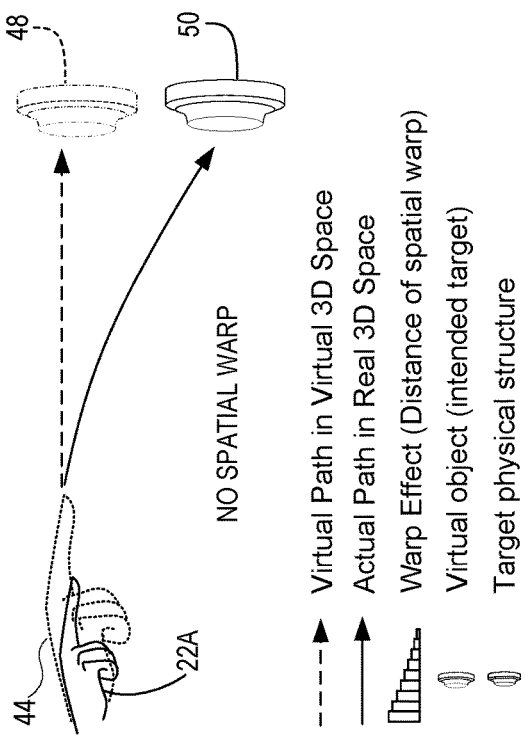
FIG. 3B
FIG. 3C
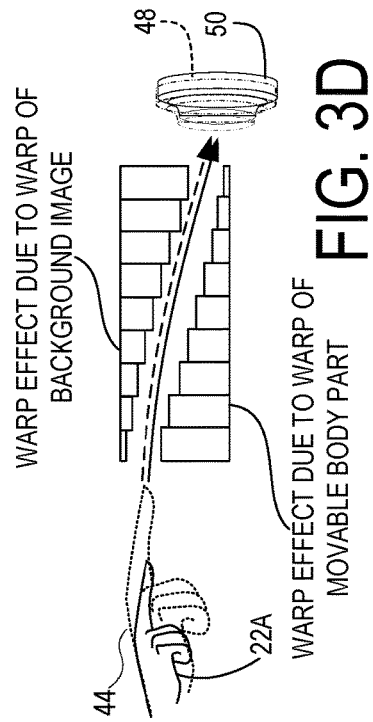
FIG. 3D
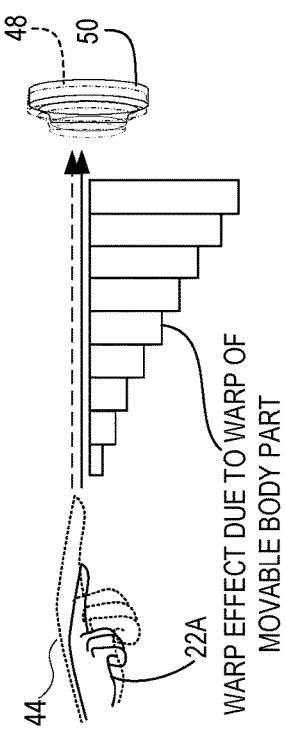

PHYSICAL HAPTIC FEEDBACK SYSTEM WITH SPATIAL WARPING

BACKGROUND

The evolution of virtual reality systems has primarily emphasized visual and auditory simulation, while the incorporation of haptics, or tactile simulation, has lagged. Tactile simulation can provide the user with tangible feedback that augments a virtual image being presented to the user. Without such tactile simulation, virtual reality technologies fail to provide the user with as authentic an immersive experience as could be provided.

SUMMARY

A computing system for physical haptic feedback with spatial warping is provided. The system may include a head mounted display device including a processor and an associated display and a sensor in communication with the processor, the sensor being configured to detect a movable body part of a user. The system may include a plurality of physical haptic feedback structures configured to be contacted by the movable body part, the structures positioned at different respective positions in real three dimensional (3D) space. The plurality of physical haptic feedback structures may include a first structure and a second structure, the first structure having haptic characteristics differentiable from the second structure.

The processor may be configured to operate the display device to display a virtual 3D space corresponding to real 3D space, and receive from the sensor data indicating a detected location of the movable body part within real 3D space. The processor may be configured to operate the display device to display a virtual reality representation of the movable body part, a position of the virtual representation of the movable body part being displayed so as to appear to be positioned in a virtual location within the virtual space corresponding to the detected location in real 3D space.

The processor may be further configured to determine, from among a plurality of virtual targets in the virtual space and a detected motion of the movable body part, an estimated intended virtual target of the movable body part, and determine a target physical structure having haptic characteristics corresponding to the intended virtual target. The processor may be further configured to compute a path in the real 3D space from the movable body part to the target physical structure and compute a spatial warping pattern to warp an image displayed on the display. Further, the processor may be configured to display via the display the virtual space and the virtual reality representation according to the spatial warping pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-D are schematic drawings illustrating the manner in which a spatial warping pattern is applied by the systems of FIGS. 1 and 2.

DETAILED DESCRIPTION

The inventors have recognized that a challenge associated with simulating tactile experiences for users of virtual reality systems is that it can be difficult to provide multiple types of haptic stimuli to the user, particularly when attempting to provide these stimuli at locations that correspond to locations of virtual objects in a virtual image shown to the user. The inventors have conceived of a way to overcome this challenge by using a plurality of real-world haptic objects that correspond to objects in the virtual environment, and through spatial warping of the image displayed to the user, redirecting a user's hand or other body part to contact an appropriate one of the physical objects for haptic stimulation, while viewing a virtual representation of their hand or other body part approaching and contacting the corresponding virtual object. A user's hand reaching for an object in the virtual environment can therefore be directed to a specific location in the real world, the display being warped to guide a user to a physical structure matching the intended haptic target of the user in the virtual space, as explained in detail below.

Figure 1:
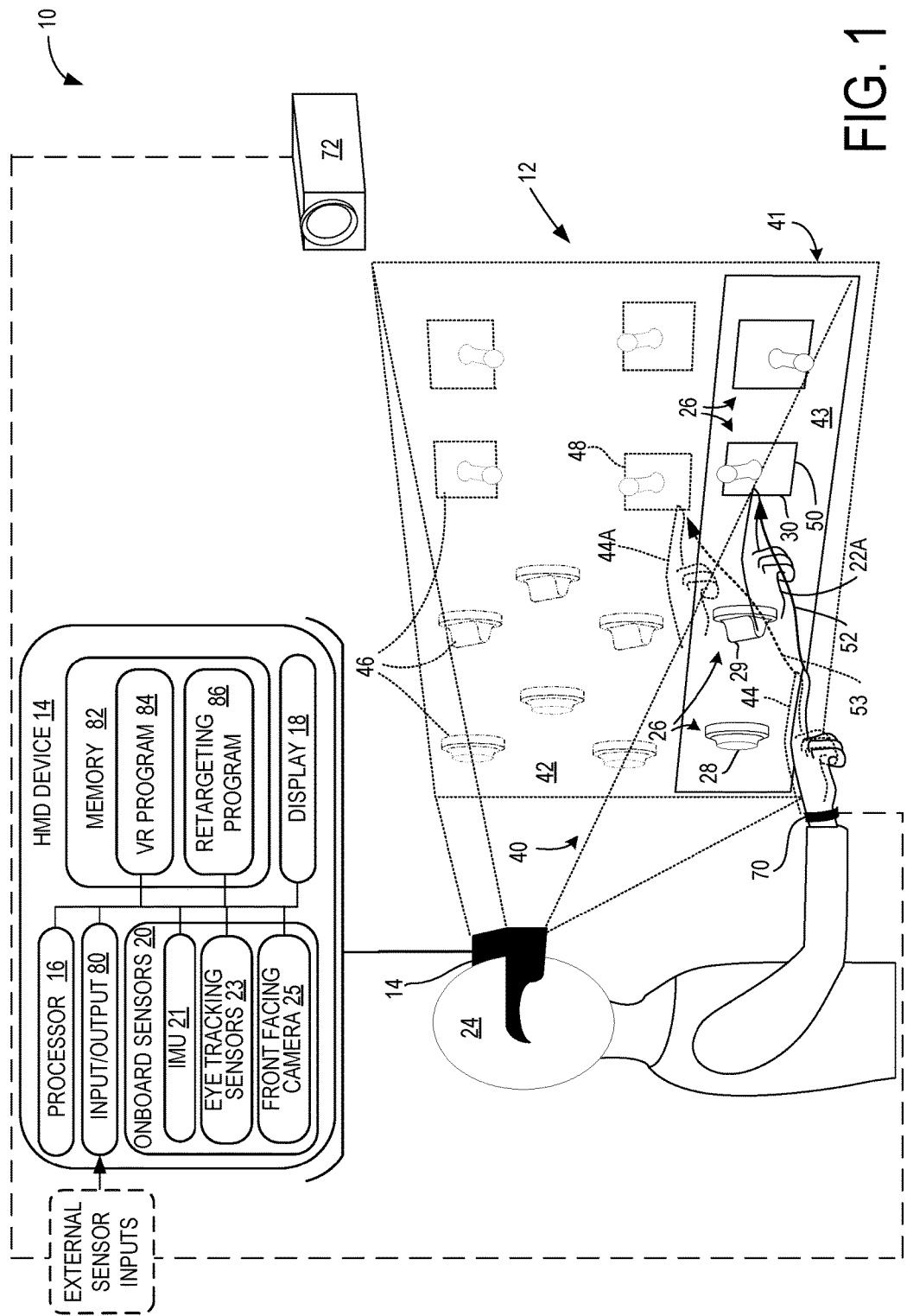
FIG. 1 is an illustration of a first implementation of physical haptic feedback system with virtual warping, including a head mounted display device configured to display a virtual 3D space to a user, and physical haptic feedback structures positioned in locations in real 3D space corresponding to the virtual 3D space.

FIG. 1 illustrates a computing system 10 for physical haptic feedback with spatial warping, according to one implementation of the present disclosure. The computing system 10 includes a haptic feedback system 12, and a head mounted display device 14 including a processor 16 and an associated display 18. The processor is configured to execute software programs stored in memory 82, as described below, to display via the display 18 a virtual 3D space 42 populated with virtual objects. The haptic feedback system 12 includes a plurality of physical haptic feedback structures 26 configured to be contacted by a movable body part 22 of a user 24. Under command of the programs executed by the processor, the image of the virtual 3D space shown to the user via the display 18 of the head mounted display device 12 can be spatially warped so that the user 24 is perceptually influenced to move the movable body part 22 to an appropriate haptic feedback structure 26, as described in detail below. Despite the spatial warping, the user 24 wearing the head mounted display device 14 in real 3D space 40 is able to interact with real objects 41 and receive haptic feedback that the user perceives is coming from the same location as the virtual objects in the virtual 3D space. By selectively applying spatial warping in this way, the programs in the HMD device 14 can guide the movable body part to an appropriate one of the plurality of haptic feedback structures 26 that provides haptic feedback that is most tailored for a particular virtual object with which the user interacts.

In order to track the user's body orientation and anticipate user interaction with the virtual objects, one or more sensors may be in communication with the processor 16 via the input/output interface 80, the sensors being configured to detect location and motion of at least one user 24 including at least one movable body part 22. Thus, the user 24 is monitored by various sensors associated with the HMD device 14, including onboard sensors 20 within the HMD device 14 and external sensors such as motion tracking device 70 and camera 72. Onboard sensors 20 may include eye tracking sensors 23 to track the user's gaze direction and an inertial motion (IMU) unit 21 that functions as a head tracking sensor to track the user's head pose orientation. If eye tracking sensors 23 are absent, the general orientation of the HMD 14 may be used. The IMU 21 may include inclinometers to monitor pitch, yaw and roll; accelerometers to measure g-forces; and gyrometers to determine angular velocity. The user's head pose orientation is typically represented as X, Y, Z position, and pitch, roll, and yaw rotation within the real 3D space. A front facing camera 25 is provided that may function as an onboard motion tracking sensor that tracks the user's movable body part, such as a hand, arm, digit, leg, foot, etc. External motion tracking sensors may also be used to track the motion of the user's movable body part 22. A virtual target 46 may be inferred from initial ballistic motion and velocity of, for example, hand motion. A motion tracking device 70 that is worn on the wrist of the user 24 may provide hand tracking data. One or more external cameras 72 may be implemented, as described below.

Camera 72 may be configured to sense visible and/or non-visible light, and may be configured as an RGB camera, depth camera, or stereo/multiple cameras, for example. When configured as a visible light camera, visible light may be sensed by a CMOS or other sensor and may be passed as image data to processor 16, which may apply image processing techniques on the image data to recognize movement of the movable part of the body 22 within the field of view of the camera 72. When configured as a depth camera, depth data may be calculated from passive stereo depth estimation techniques or phase or gated time of flight techniques. A structured light depth imaging approach may be employed, where, in one implementation, an illumination pattern of infrared light rays is projected onto surfaces of the real 3D space 40. In this implementation, the depth camera is configured to receive the reflected structured light and the processor 16 calculates depth data for the surfaces. The depth camera may output a depth image, which for each pixel captured in the image contains a depth value sensed by the depth camera. By capturing visible light image data and depth image data in this manner, skeletal tracking techniques may be applied to identify the movable body part 22 within the images, and track the position, motion, and gestures performed by the movable body part 22 within the real 3D space 40.

It should be understood that this list of sensors that can be used as onboard sensors 20 and external sensors is meant to be illustrative, not exhaustive. For example, optical tags may be affixed to the user's movable body part, and an array of visible light sensors may be provided, with processor 16 configured to recognize the position and motion of the tags based on the position of the tag in the images output by each sensor in the array. Additionally, the user 24 and the real 3D space 40 may be monitored by radar, lidar, acoustic sensors, RF beacons, or magnetic sensors, where the sensors may be wearable as well.

The input/output interface 80 of HMD display device 14 is configured to enable the HMD device 14 to communicate with remote devices such as remote computers, cameras, and accessory devices, typically via a wired (e.g., Ethernet or USB) or wireless (e.g. WIFI or BLUETOOTH) connection. A virtual reality program 84 and retargeting program 86 are stored in non-volatile memory (E.g., FLASH RAM) 82 of the HMD device 14 and executed using portions of volatile memory (E.g., RAM) of memory 82 by processor 16. The virtual reality program 84 and a retargeting program 86 are executed by the processor 16, using portions of memory 82. Each of the components of display device 14 are configured to exchange data and communicate as described below.

The haptic feedback system 14 includes a plurality of physical haptic feedback structures 26, which are configured to be contacted by the movable body part 22. The haptic feedback structures 26 are positioned at different respective positions in real 3D space 40. It will be appreciated that the physical haptic feedback structures 26 may be stationary objects, movable objects, or objects that include movable parts, and may be mounted to a continuous body such as such a panel 43. It will be appreciated that first, second and third types of structures 28, 29, and 30 are depicted in FIG. 1, each having haptic characteristics that are differentiable from each other. One potential advantage of having a plurality of haptic feedback structures 26 with differentiable haptic characteristics is that a plurality of virtual objects may be mapped to a first haptic feedback structure 28 while concurrently a plurality of virtual objects with different haptic characteristics may be mapped to a second haptic feedback structure 29, and so on. In the illustrated implementation, the first structure 28 is a button while the second structure 29 is a dial and the third structure 30 is a switch. The illustrated types of haptic feedback structures are not intended to be limiting, as a variety of types of structures may be utilized. For example, haptic feedback structures may be used that feature soft or hard surfaces, hot or cold surfaces, tacky or smooth surfaces, etc.

As discussed above, the processor 16 is configured to operate the HMD display device 14 to display a virtual 3D space 42 corresponding to real 3D space 40. Furthermore, the processor 16 is configured so that it may receive data from the various sensors, including data that indicates a detected location of the movable body part 22 within the real 3D space 40. By supplying data from onboard sensors 20 and external sensors via the input/output interface 80, the accuracy of the system's determination of the position of the movable body part may be enhanced.

The display device 14 is operated by the processor 16 to display a virtual reality representation 44 of the movable body part 22. The position of the virtual representation 44 of the movable body part 22 is displayed so as to appear to be positioned in a virtual location within the virtual 3D space 42 corresponding to the detected location in real 3D space 40, at least prior to spatial warping. In one example, the movable body part may be object locked to the detected location of the movable body part 22, at least prior to the movable body part entering a region to which a spatial warping pattern has been applied. When spatial warping is applied, as discussed in detail below, the location of the virtual representation of the movable body part in virtual 3D space and the actual location of the movable body part in real 3D space may be separated, and the paths of the movable body part 22 through the real 3D space 40 and the virtual 3D space 42 will diverge as shown in FIG. 1 by the difference in positions at 22A, 44A. One potential advantage of object-locking the virtual representation 44 of the movable body part 22 to the detected location of the movable body part 22 prior to applying spatial warping is that the user's perception that the virtual movable body part 22 is enhanced to feel more realistic by the correspondence in position.

The processor 16 is further configured to determine, from among a plurality of virtual targets 46 in the virtual 3D space 42 and a detected motion of the movable body part 22, an estimated intended virtual target 48 of the movable body part 22. The intended virtual target 48 may be determined from user gaze direction, user gaze duration, movement of the movable body part 22 that may be projected in a vector direction, voice indication of the user 24, and/or the application context of the virtual reality program depicting the virtual 3D space 42. Thus, for example, if the application context indicates that a virtual telephone is ringing in virtual 3D space 42, the user's gaze is directed to the virtual telephone, the user is detected as saying "Let me answer," and the user's movable body part 22 is detected as beginning to move in a direction toward the virtual telephone, then the virtual reality program 84 is likely to determine that the user's intended target is the virtual telephone, rather than a virtual coffee cup that is placed next to the virtual telephone.

It will be appreciated that after estimating an intended virtual target 48, the haptic feedback system 12 via the processor 16 may determine from among the haptic feedback structures 26 a particular target physical structure 50 that has haptic characteristics corresponding to the intended virtual target 48. The processor 16 may be configured to determine to which of the plurality of physical haptic feedback structures 26 the movable body part 22 is to be directed based on various parameters including a distance between a current location of the movable body part 22 and the target physical structure 50, an orientation of the target physical structure 50 and the virtual targets 46 in the virtual 3D space 42, or a haptic feedback mechanism in the target physical structure 50. Trajectory and velocity of the detected motion of the user 24 may influence this determination as well. Thus, for example, a target physical structure 50 may be determined from among the plurality of haptic feedback structures 26 based on which haptic feedback structure 26 is closest to the movable body part 22. Further, a physical haptic feedback structure 26 may be selected on the basis of haptic similarity to the intended virtual target 48, or selected based on the extent to which a spatial warping pattern would have to be applied. Another factor that may need consideration is the presence of obstructions between the user 24 and the physical haptic feedback structures 26, which may be additional users. Since multiple factors are involved, these factors may be weighted and compared in making the determination.

Following this determination, the processor 16 is configured to compute a path 52 in real 3D space 40 from the movable body part 22 to the target physical structure 50. The processor 16 is further configured to compute a spatial warping pattern to warp an image displayed on the display 18. Via the display 18, the processor 16 is configured to display the virtual 3D space 42 and the virtual reality representation 44 according to the spatial warping pattern.

Once an estimated intended visual target 48 of the user 24 is determined, the spatial warping pattern is applied to the image of the virtual 3D environment, warping a portion of it through which the movable body part 22 is being directed. As the user 24 perceives the virtual representation 44 of the movable body part 22 moving through the warped virtual 3D space 42, the haptic feedback system 12 guides the user 24 to direct the movable body part 22 along path 52 to the target physical structure 50, while the virtual representation 44 of the movable body part 22 moves along a virtual path 53 to the intended virtual target 48. Accordingly, the virtual path 53 diverges from the path 52. The user 24 may therefore interact with the virtual target 46 while sensing haptic feedback from an appropriately selected target physical structure 50, without perceiving that the haptic feedback system 12 has altered the path 52 of the movable body part 22 in order to supply the appropriate haptic feedback.

In the illustrated implementation of FIG. 1, it was determined that the user 24 intends to interact with an intended virtual target 48 that is a switch that is set in an upward orientation; in response to this anticipated interaction of user 24 with the virtual 3D space 42, the system 10 spatially warps a portion of the virtual 3D environment 42 to enable the user 24 to interact with a target physical structure 50 that is a switch positioned in an upward position, similar to the estimated intended virtual target 48.

Figure 5:
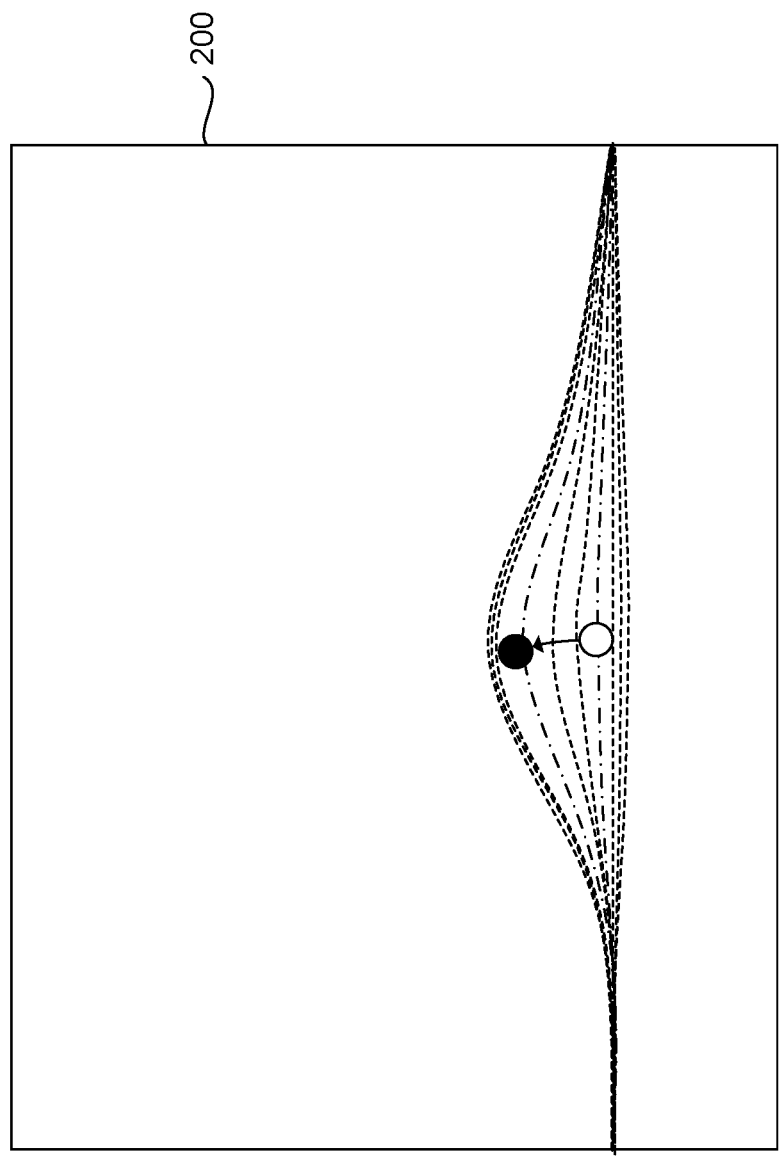
FIG. 5 is a graphical depiction of a spatial warping pattern applied by the systems of FIGS. 1 and 2.

As shown in FIG. 5, the spatial warping may be accomplished by applying a spatial warping pattern 200. The spatial warping pattern may be configured as a vector field applied within a region of spatial warping. The vector field may operate to shift the position of the virtual representation 44 of the movable body part 22 by the distance indicated by a component vector in the field as the movable body part 22 passes through the region. The contour lines of such a vector field are illustrated in FIG. 5. In FIG. 5, the white dot represents the position of a portion of the movable body part 22 in an original image that has not been warped. An object on the lower dot dashed line will be warped based on the size and direction of the vector underlying the lower dot. By applying spatial warping, the virtual representation 44 of the movable body part 22 may be warped to the location shown by the black circle. To avoid warping of the actual image of the virtual representation 44 of the movable body part 22, only the central location of the movable body part 22 is warped, and the virtual representation 44 is placed with reference to the central location, as opposed to a pixel-by-pixel warping which would distort the image. The spatial warping pattern is applied to a region of real 3D space 40, and thus as the user 24 disengages with the target physical structure 50, the movable body part 22 may pass through the spatial warping pattern again. The spatial warping pattern may be cancelled once the movable body part 22 is removed from the region of spatial warping, and the haptic feedback system 12 determines that the user 24 no longer intends to interact with the intended virtual target 48.

Figure 2:
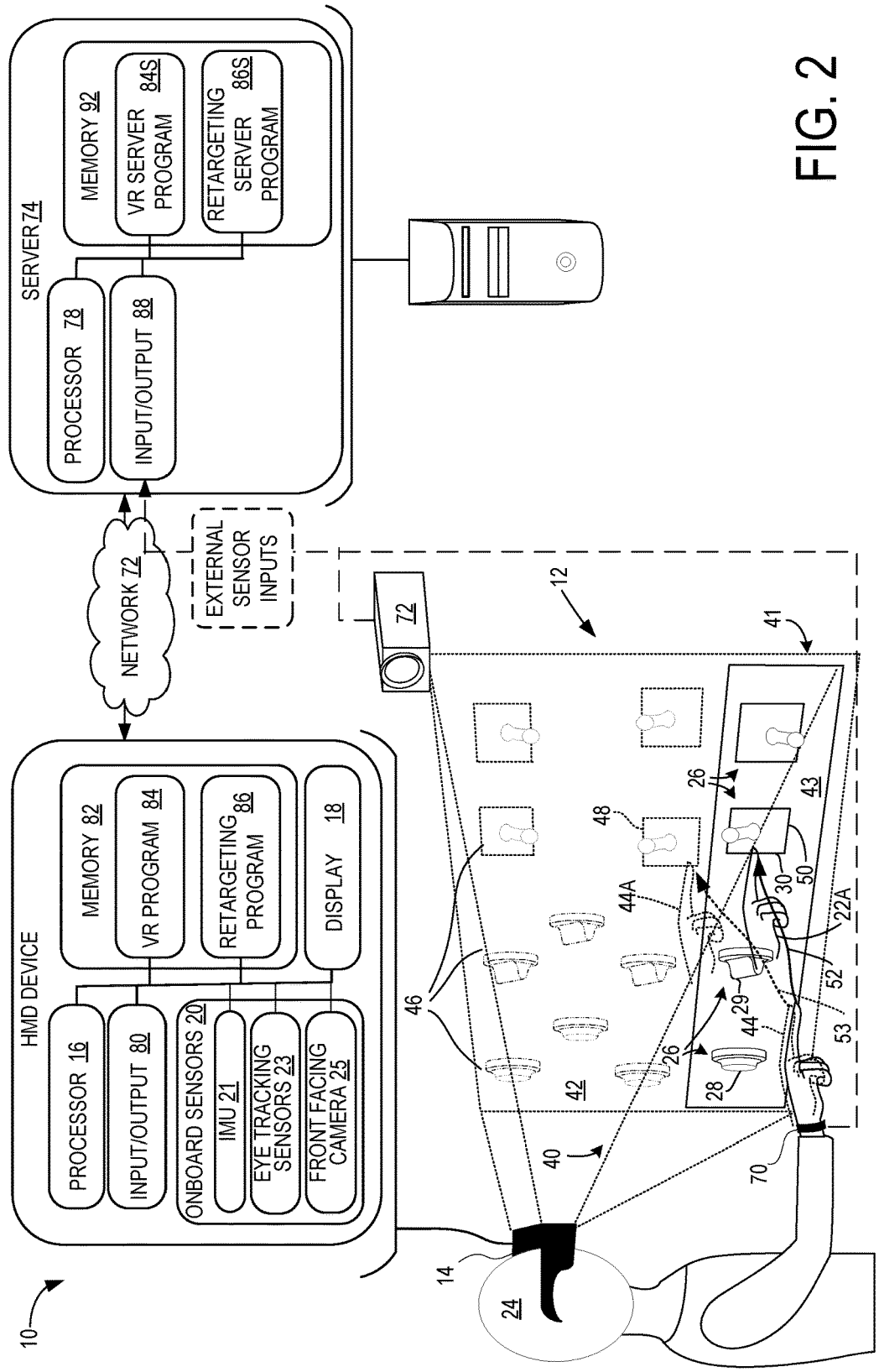
FIG. 2 illustrates a second implementation of a physical haptic feedback system with virtual warping, configured with a server in communication with the head mounted display device and other components of the system.

FIG. 2 shows a second implementation of the computing system 10, in which the head mounted display device 14 may be communicatively connected to a server 74 via network 72. The network 72 may be a wired or wireless, local or wide area network, for example. Server 74 includes a processor 78, memory, and an input/output interface 88. A virtual reality server program 84S and retargeting server program 86S are stored in non-volatile memory of memory 92 and executed by processor 78 using portions of volatile memory of memory 92. In this implementation, external sensors such camera 72 and motion tracking device 70 are configured to communicate via the network 72 and the input/output interface 88 with the server 74. With this configuration, data from the external sensors is fed to the server 74, and the virtual reality server program 84S is configured to compute the virtual 3D space in the manner performed by virtual reality program 84 in the first implementation. The server 74 may be configured to receive data from the HMD device 14 indicating values detected by onboard sensors 20, may perform computations for the virtual 3D space 42 based on this data and based on the external sensor inputs it has received, and may then send the computed display data to the HMD device 14 via network 72 for display to the user 24 via display 18. Since the HMD device 14 is portable and is powered by one or more rechargeable batteries, it will be appreciated that by performing these computations on the server 74, battery life on the HMD device 14 may be improved.

The spatial warping pattern is computed to redirect the movable body part 22 along the computed path 52 to the target physical structure 50. FIGS. 3A-3D depict the manner in which the spatial warping pattern may be applied. The image warped by the spatial warping pattern may be a relevant portion of the image of the virtual 3D space 42, through which the movable body part 22 passes. FIG. 3A illustrates this application of image warping. In the virtual 3D space 42, the user 24 observes the virtual reality representation 44 of a movable body part 22, which in this instance is the user's hand. The user 24 directs her hand toward a virtual target 46, the sensors recording the movement and the processor 16 determining the estimated intended virtual target 48 and a target physical structure 50. As shown in FIG. 3A, the target physical structure 50 in real 3D space 40 is not aligned with the estimated intended virtual target 48 in virtual 3D space 42. If no spatial warp were applied, the movable body part 22 and virtual reality representation 44 would not be able to traverse the actual path 52 and virtual path 53 concurrently. In FIG. 3B, a spatial warping pattern is applied to the image of the virtual 3D space 42, as shown in FIG. 3B. Via the display 18, the processor 16 warps the image of the virtual 3D space 42 as shown to the user 24 such that the target physical structure 50 and the estimated virtual target 48 as observed by the user 24 align. This alignment is based on the calculation of path 52 by the processor between the movable body part 22 and the target physical structure 50. The warp effect (i.e., distance of warp) due to the warping of the background image of the virtual 3D space 42 is shown graphically to increase as the movable body part 22 approaches the target physical structure 50. It will be appreciated that since the background image is warped, the virtual reality representation 44 of the intended virtual target 48 has shifted in position downward to the location of the target physical structure 50. Warping the background image may also be referred to as "world warping."

Alternatively, as shown in FIG. 3C, the image warped by the spatial warping pattern may be the virtual reality representation 44 of the movable body part 22. In this case, rather than warping the background image of the virtual 3D space 42, the foreground image of the movable body part 22 is warped. It will be appreciated that since the foreground image (i.e., the virtual representation 44 of the movable body part 22) is shifted, the virtual reality representation 44 is shown traveling straight toward the intended virtual target 48, rather than downward toward the target physical structure 50.

In this case, it is determined that the user 24 must direct her hand to the target physical structure 50 that is currently aligned with a different virtual target 46 than the estimated intended virtual target 48. Consequently, a spatial warping pattern is applied to the virtual reality representation 44 of the user's hand, as shown in FIG. 4B. Via the display 18, the processor 16 warps the virtual reality representation 44 as shown to the user 24 such that the user 24 observes her hand in the virtual 3D space 42 to be a distance from the estimated intended virtual target 48 that coincides with a distance to the target physical structure 50 in real 3D space 40. This alignment is based on the calculation of path 52 by the processor between the movable body part 22 and the target physical structure 50.

FIG. 3D illustrates that a combination of spatial warping of the virtual reality representation 44 of the movable body part 22 and of the background image of the virtual 3D space 42 may be applied. This may be useful to minimize user perception that elements in either the background or foreground image have been spatially warped, for example. Warping of both the image of the virtual 3D space 42 and the virtual reality representation 44 of the movable body part 22 with a spatial warping pattern can reduce the amount by which either image is warped, thereby avoiding excessive image distortions or perception by the user 24 of misalignment between the virtual 3D space 42 and the real 3D space 40.

As shown in FIG. 4B, it will be appreciated that the spatial warping pattern may be dynamically recalculated by the processor 16 in a series of time steps, illustrated as T1-T4, based on dynamic determination of the intended target 48 of the movable body part 22. The retargeting program 86 executed by the processor 16 determines, as shown in FIG. 4B, that the user 24 intends to interact with an updated virtual target 48A rather than the original determined intended virtual target 48. In this case, the retargeting program 86 is configured to determine a virtual path 53 to the updated virtual target 48A, and determine an updated physical path 52A to an updated target physical structure 50A. Therefore, the movable body part 22 is redirected dynamically to the updated target physical structure 50A. As a result, after moving toward the targets, the movable body part 22 contacts the target physical structure 50 concurrently with the virtual reality representation 44 of the movable body part 22 appearing to contact the intended virtual target 48. As shown in FIG. 4C, the dynamic retargeting implemented by the retargeting program 86 may also select an updated target physical structure 50A even when the intended virtual target 48 remains the same. For example, the intended virtual target 48 may have changed state in the game from a COLD button to a HOT button. In this case, the retargeting program 86 may re-compute an updated physical path 52A to the nearest physical target structure 50 that features the HOT haptic characteristic associated with the updated virtual target state.

Figure 4A:
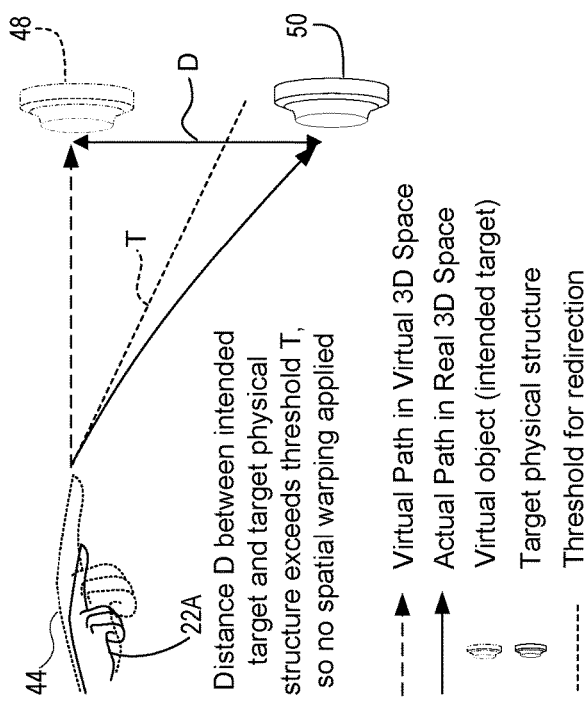
FIGS. 4A-4C illustrate thresholds applied to determine whether a spatial warping pattern is to be applied, as well as retargeting of spatial warping toward new physical target structures and virtual targets.
Figure 4B:
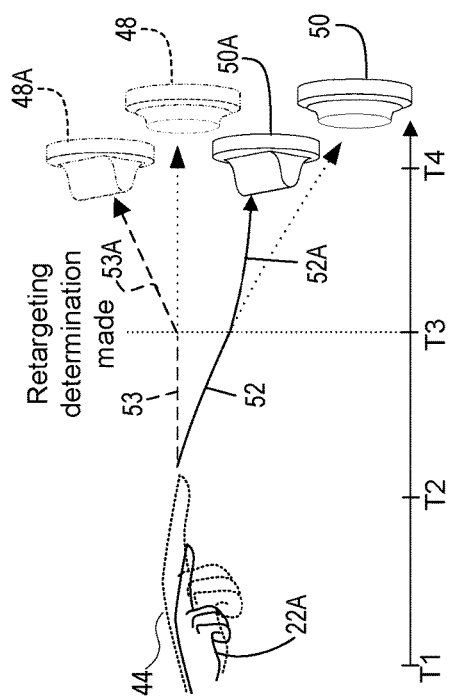
Figure 4C:
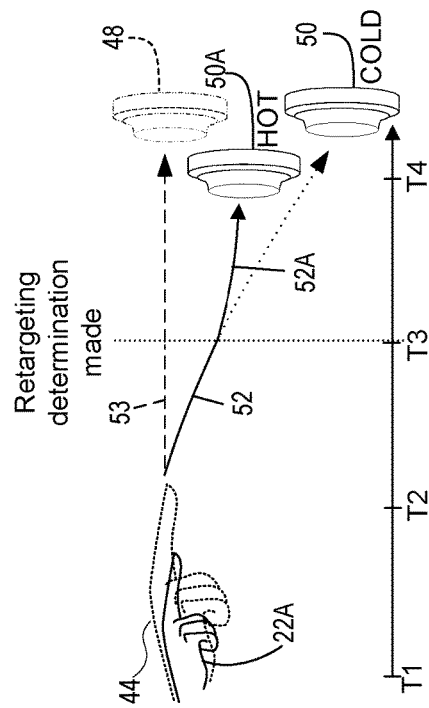

Turning now to FIG. 4A, prior to applying the spatial warping pattern, the processor 16 may be configured to determine whether or not a spatial warping pattern is to be applied to the haptic feedback system 12, to avoid a situation in which the spatial warping is perceivable by the user 24. This determination may be made based on a threshold distance D between the intended virtual target 48 and the target physical structure 50. For example, the distance D between the intended virtual target 48 and the target physical structure 50 may be examined to determine whether it exceeds a threshold T, which may be a linear function based on the distance from the current position of the movable body part 22, as shown. If the threshold T is exceeded, then the haptic feedback system 12 may determine not to apply the spatial warping pattern, since warping beyond the threshold runs the risk of being perceivable by the user 24, and if the threshold is not exceeded, then the spatial warping pattern may be applied. When computing spatial warping patterns for virtual targets 46 of the user, there may be a plurality of possible paths 52 to the target physical structures 50 that are within the threshold depicted in FIG. 4A. In such cases the spatial warping pattern may be computed to be minimized, thereby minimizing an amount by which the image displayed is warped.

As briefly discussed in relation to FIG. 4C, it will be appreciated that one or more of a plurality of physical haptic feedback structures 26 may be dynamically mapped to a plurality of virtual targets 46 in the virtual 3D space 42. A user 24 may be directed to any one of a plurality of target physical structures 50 based on various factors as described above, and a plurality of virtual targets 46 may be mapped to a single target physical structure 50. The mapping between virtual targets 46 and target physical structures 50 may, however, be altered by the computing system 10 based on the given virtual 3D space 42 and the factors previously described. Similar to the above discussion, the detected motion of the movable body part 22 by the onboard sensors 20 or external sensor inputs is used by the processor 16 to determine, of the plurality of virtual targets 46 in the virtual 3D space 42, the estimated intended virtual target 48. The movable body part 22 is then directed to one of a plurality of physical haptic feedback structure 26 that have a haptic characteristic corresponding to the intended virtual target 48, based on this determination.

Retargeting may be implemented by calculation using several variables. A point $P_v$ in the virtual 3D space 42 may be mapped to a physical proxy point $P_p$ so that for an offset $T_f$ $$T_f = P_v - P_p.$$

If $H_p$ is the physical position of the movable body part 22 and $H_0$ is a fixed point, $$D_s = |H_p - H_0|, D_p = |H_p - P_p|.$$

A gradual offset W may be added to the position of the virtual representation 44 using a shift ratio $\alpha$:

$$W = \alpha T_f, \alpha = \frac{D_s}{D_s + D_p}.$$

At the beginning of the motion, the shift ratio has a value of 0 while at full offset the shift ratio is 1, when the movable body part 22 touches the target physical structure 50 in conjunction with the virtual representation 44 appearing to touch the intended virtual target 48. Retargeting is accomplished by interpolation between the current retargeting and the updated retargeting to the new target:

$$W = \alpha T_f + (1-\alpha) T_0$$

where $T_0$ is the original offset. In a frame where a new touch target is determined, $H_0 = H_p$.

Figure 6:
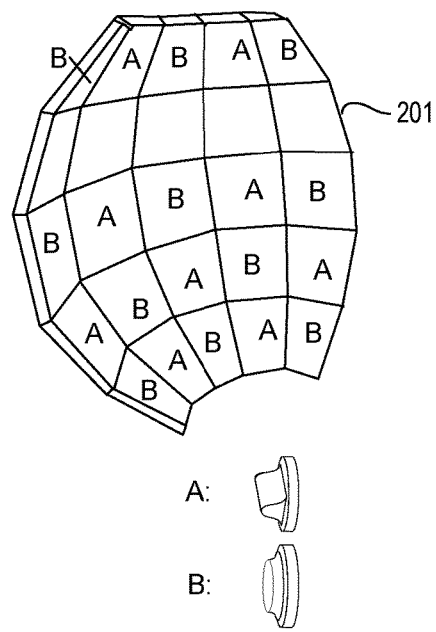
FIG. 6 is a schematic view of a haptic feedback system of the system of FIGS. 1 and 2, formed with a convex base element.
Figures 7A, 7B, 7C:
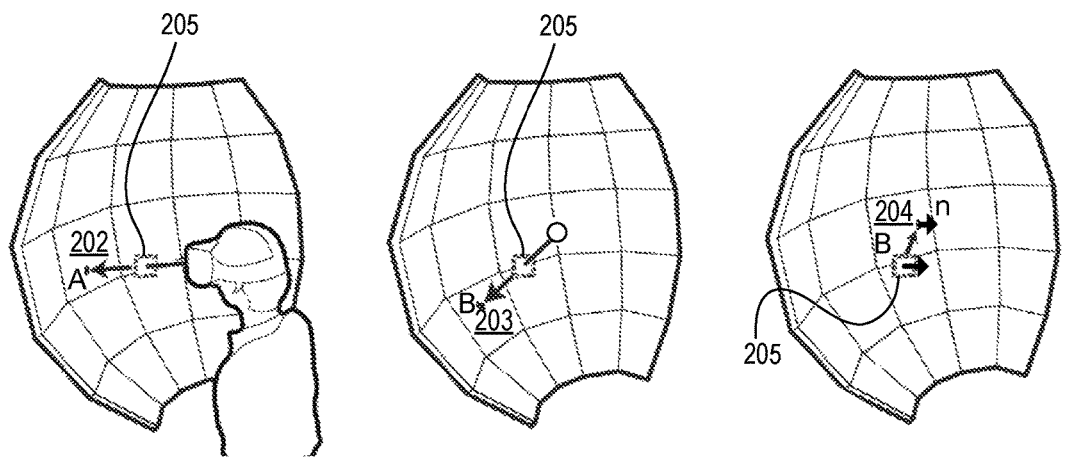
FIGS. 7A-7C are schematic views of the haptic feedback system of FIG. 6, with determination of a target physical structure from among the haptic feedback structures based upon proximity and similarity between the virtual target and haptic feedback structures.

FIG. 6 is a schematic view of a haptic feedback system 12 formed by a convex base element 201 having a continuous convex surface formed of a plurality of subplanes, with many of the subplanes including a haptic feedback structure mounted thereto. As shown, a first type of haptic feedback structure A (rotating knob) and a second type of haptic feedback structure B (push button) are positioned throughout the convex surface. A haptic feedback system 12 of this construction may be useful, for example, in cockpit simulations implemented by a flight simulator virtual reality program. By positioning the first and second types of haptic feedback structures throughout the convex surface, the feedback system 12 can select from among multiple candidate structures when computing a path 52 to a particular target physical structure 50 for a user 24. As shown in FIGS. 7A-7C, to choose a target physical structure 50, the feedback system 12 may first examine the proximity between each candidate haptic feedback structure 26, either by line of sight (FIG. 7A) or closest distance (FIG. 7B), and also may look at the similarity between the virtual target 46 and the physical candidates by (1) type of haptic characteristic (e.g., rotating knob vs. push button) and (2) similarity of orientation (surface normal similarity between the surface normal of the virtual target 205 and the surface normal of the candidate haptic feedback structure—see FIG. 7C). Presuming the virtual target 46 is displaying an image of a push button A, the haptic feedback structure 202 would be rejected for consideration by the feedback system 12, since it is the incorrect type of haptic characteristic, while haptic feedback structures 203 and 204 would remain under consideration for target physical structures 50. A comparison such as discussed above would be applied that weighed the closer distance between the virtual target 205 and haptic feedback structure 203 against the closer similarity in surface normal orientation between virtual target 205 and haptic feedback structure 204. The comparison logic could be application specific, such that a developer could adjust the weighting to suit the needs of the specific application.

A score may be calculated to make the determination of a target physical structure 50 from among the haptic feedback structures 26. Distance to the target physical structure 50, similarity between the intended virtual target 48 and the target physical structure 50, and orientation of a surface normal of the target physical structure 50 may, among other factors, be considered in the score. For example, within a group of haptic feedback structures 26 having a small shift ratio $\alpha$ there may be a particular feedback structure that is farther away but has a texture matching the intended virtual target 48. Also, in this example the particular feedback structure may have a 35° surface normal over another one with a 45° surface normal, which more closely matches the surface normal of the intended virtual target 48. Consequently, the haptic feedback structure 26 with these characteristics may be given a high score as a potential target physical structure 50.

In addition, a dynamic haptic adjustment mechanism may be employed in the haptic feedback system 12. Given that physical haptic feedback structures 26 may have a plurality of haptic characteristics, each of which may be variable, a dynamic haptic adjustment mechanism may adjust the haptic characteristics of the physical haptic feedback structures 26. Possible haptic characteristics include, but are not limited to, applied force, pressure, rotation, rotatability, mechanical resistance, vibration, deformability (e.g., hardness or easy compressibility), elasticity, material texture (e.g., smoothness or roughness), temperature, electrical charge, electrical resistance, pressure from vented air (non-contact), and emitted ultrasound (non-contact).

Alterations by the dynamic haptic adjustment mechanism may include altering the haptic characteristic itself, for example controlling a haptic feedback structure 26 to rotate instead of vibrate. Alternatively, the dynamic haptic adjustment mechanism may adjust the intensity of the haptic characteristic. A physical haptic feedback structure 26 emitting heat may be controlled to decrease or increase the amount of heat emitted by the dynamic haptic adjustment mechanism. In the example of FIG. 4C, it will be appreciated that two physical buttons are provided, one hot and one cold; however, alternatively a dynamic haptic adjustment mechanism may be provided in the form of a single button that may switch from a hot state to a cold state. The adjustment itself may be determined based on a specific virtual reality implementation in the virtual reality system. Alternatively, the adjustment may depend on user interaction with features of the virtual 3D space 42. In one implementation, a user 24 depressing a button that appears as a virtual target 48 in a vehicle in the virtual 3D space 42 to maneuver towards a heat source may subsequently feel heat from another haptic feedback structure 26. In this way, dynamic adjustment of the haptic characteristics may be used to provide dynamic haptic experiences that match the content or state of the virtual reality program 84.

Furthermore, a haptic characteristic may be altered by the dynamic haptic adjustment mechanism according to determination of the intended virtual target 48 of the movable body part 22. In one implementation, should a user 24 reach for an estimated intended virtual target 48 that represents a brake control in a virtual vehicle, she may be directed to a target physical structure 50 that may alter its mechanical resistance based on whether it functions as a brake or as an accelerator. In another implementation, a user 24 that touches a haptic feedback structure 26 in one area may feel a vibration only from that location on the haptic feedback structure 26. Also possible through the implementation of redirection is guiding a user 24 with a portable object. Based on the detected target destination of a portable object held or carried by the user 24, the processor 16 via the display 18 may direct the user to place the object in a particular location using the application of a spatial warping pattern.

As some examples, the target physical structures 50 may include a handle, dial, knob, button, switch, toggle, wheel, lever, pedal, pull, key, joystick, adjuster, or a touchpad. Alternatively, the target physical structures 50 may include tools, utensils, training equipment, or other objects appropriate to the specific implementation of the virtual reality system. In one implementation, the physical haptic feedback structures 26 may be surfaces formed as regions on a continuous surface of a base material, such as a support element. In this configuration, one continuous haptic surface has regions of differentiable haptic characteristics. In one implementation, a first surface or region on the continuous surface may radiate heat while a second surface or region on the continuous surface may vibrate. In another implementation, the continuous surface may be divided into sub-panels having different angular orientations relative to each other. For example, the continuous surface of the support element may be formed of a connected group of sub-planes generally approximating a curve around a central zone within which a user stands when using the system.

Figure 8:
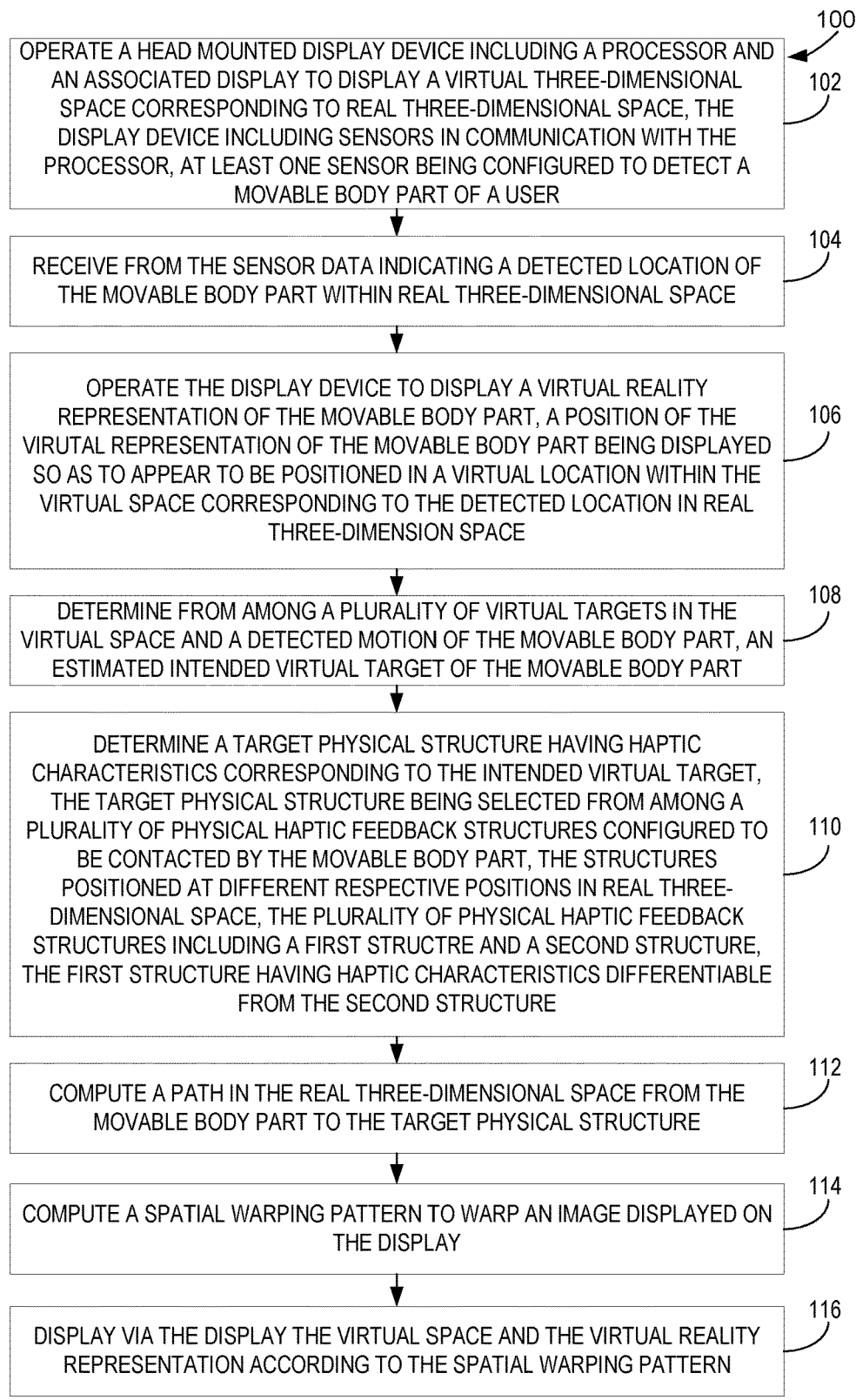
FIG. 8 is a flowchart of a method for use with a computing device for a physical haptic feedback system with spatial warping according to one implementation of the present disclosure.

FIG. 8 is a flow chart of a method for use with a computing device, for a physical haptic feedback system with spatial warping. Method 100 may be executed using the systems described above, or utilizing other suitable hardware and software elements.

At 102, the method includes operating a head mounted display device 14 including a processor 16 and an associated display 18 to display a virtual 3D space 42 corresponding to real 3D space 40, the display device 14 including onboard sensors 20 in communication with a processor 16. At least one sensor is configured to detect a movable body part 22 of a user 24.

At 104, the method further includes receiving from the sensor data indicating a detected location of the movable body part 22 within real 3D space 40. The method at 106 may further include operating the display device 14 to display a virtual reality representation 44 of the movable body part 22. The position of the virtual representation 44 of the movable body part 22 appears to be in a virtual location within the virtual 3D space 42 corresponding to the detected location in real 3D space 40.

The method at 108 may further include determining, from among a plurality of virtual targets 46 in the virtual 3D space 42 and a detected motion of the movable body part 22, an estimated intended virtual target 48 of the movable body part 22. At 110, the method may further include determining a target physical structure 50 having haptic characteristics corresponding to the intended virtual target 48, the target physical structure 50 being selected from among a plurality of physical haptic feedback structures 26 configured to be contacted by the movable body part 22, the structures 26 positioned at different respective positions in real 3D space 40, the plurality of physical haptic feedback structures 26 including a first structure and a second structure, the first structure having haptic characteristics differentiable from the second structure.

At 112, the method may further include computing a path 52 in the real 3D space 40 from the movable body part 22 to the target physical structure 50. The method at 114 may further include computing a spatial warping pattern to warp an image displayed on the display 18. The method at 116 may further include displaying via the display 18 the virtual 3D space 42 and the virtual reality representation 44 according to the spatial warping pattern.

As described above, the processor 16 may be configured to determine to which of the plurality of physical haptic feedback structures 26 the movable body part 22 is to be directed. This determination may be based upon a distance between a current location of the movable body part 22 and the target physical structure 50. An orientation of the target physical structure 50 and the virtual target 48 in the virtual 3D space 42 and a haptic feedback mechanism in the target physical structure 50 may also be used in the determination. A clear path in the real 3D space 40 to the target physical structure 50 is also a factor. The spatial warping pattern may be computed to redirect the movable body part 22 along the computed path 52 to the target physical structure 50. This may be accomplished by warping an image of the virtual 3D space 42 according to the spatial warping pattern; alternatively, an image of the virtual reality representation 44 of the movable body part 22 may be warped by way of the spatial warping pattern. It will be appreciated that both images or a combination of images may be warped as well.

As further described above, the spatial warping pattern may be computed to redirect the movable body part 22 along the computed path 52 to the target physical structure 50, where the processor 16 is further configured to dynamically recalculate the spatial warping pattern in a series of time steps based on dynamic determination of the intended target 48 of the movable body part 22. Therefore, redirection of the movable body part 22 to the target physical structure 50 may be dynamic. Optimally the movable body part 22 will contact the target physical structure 50 concurrently with the virtual reality representation 44 of the movable body part 22 appearing to contact the intended virtual target 48. The path 52 may be one of a plurality of possible paths to the target physical structure 50. Computation of the spatial warping pattern may include computing a minimized spatial warping pattern that minimizes an amount by which the image displayed is warped. Application of the spatial warping pattern, based upon a threshold distance between the intended virtual target 48 and the target physical structure 50, may also be executed via the processor 16 as specified above.

As also described above, at least one of the plurality of physical haptic feedback structures 26 may be dynamically mapped to a plurality of virtual targets 46 in the virtual 3D space 42. The processor 16 may determine the estimated intended virtual target 48 of the movable body part 22 from among the plurality of virtual targets 46 in the virtual 3D space 42. Based on the detected motion of the movable body part 22 and the estimated intended virtual target 48, the movable body part 22 may be directed to a physical haptic feedback structure 26.

As described above, via a dynamic haptic adjustment mechanism, at least a first haptic characteristic of the physical haptic feedback structures may be adjusted. Haptic characteristics may include applied force, pressure, rotation, rotatability, mechanical resistance, vibration, deformability (e.g., hardness or easy compressibility), elasticity, texture (e.g., smoothness or roughness), temperature, electrical charge, electrical resistance, pressure from vented air (non-contact), and emitted ultrasound (non-contact). It will be appreciated that alternatively the physical haptic feedback structures 26 may be implemented to include a first surface and a second surface formed as regions on a continuous surface of a base material.

Figure 9:
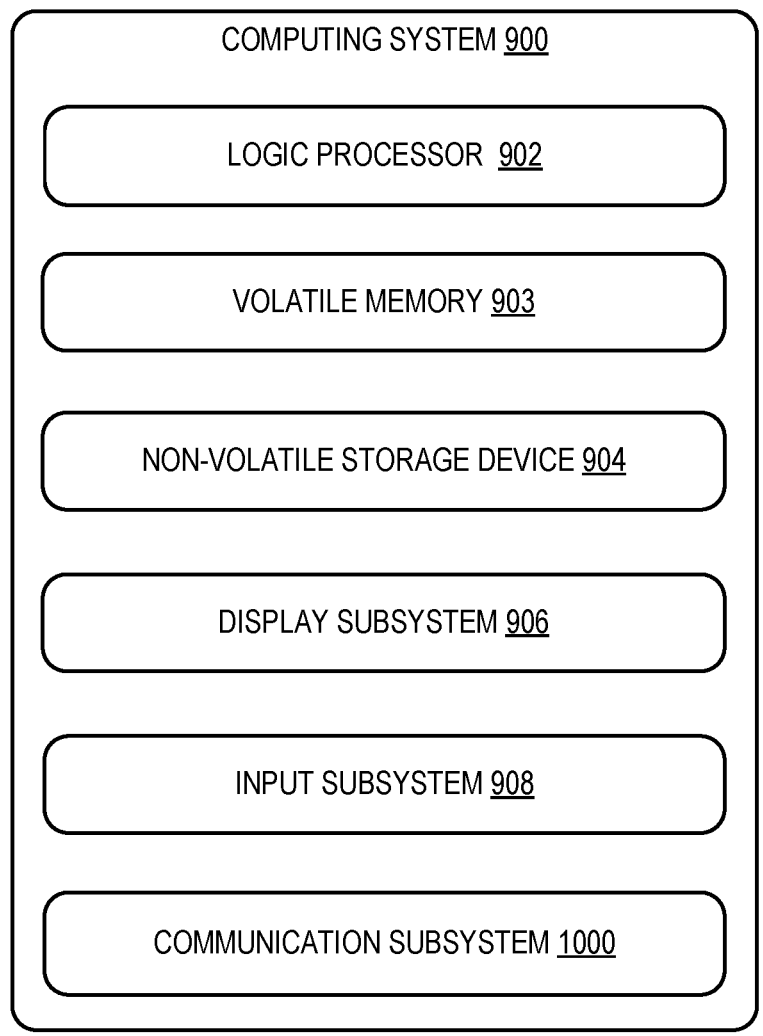
FIG. 9 is a schematic depiction of an example computer device that may be used as the computing devices in the systems of FIGS. 1 and 2.

FIG. 9 schematically shows a non-limiting embodiment of an example computing system 900 that can enact one or more of the methods and processes described above. Example computing system 900 is shown in simplified form. Example computing system 900 may embody the computing system 10. Example computing system 900 may take the form of one or more personal computers, server computers, tablet computers, network computing devices, mobile computing devices, mobile communication devices (e.g., smart phone), and/or other computing devices.

Example computing system 900 includes a logic processor 902, volatile memory 903, and a non-volatile storage device 904. Example computing system 900 may optionally include a display subsystem 906, input subsystem 908, communication subsystem 1000, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, it will be understood that these virtualized aspects are run on different physical logic processors of various different machines.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903. One example of volatile memory 903 is random access memory (RAM).

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of example computing system 900 that is typically software stored in non-volatile memory and implemented by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller. When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow example computing system 900 to send and/or receive messages to and/or from other devices via a network such as the Internet.

According to the haptic feedback system 12 as described, haptic simulation in a virtual 3D space 42 with a plurality of virtual targets 46 may be provided by way of multiple physical haptic feedback structures 26 that are mapped to the virtual targets 46. By way of this haptic feedback system 12, a user 24 can be directed to specific physical objects corresponding to perceived virtual objects in the virtual 3D space 42. Multiple physical objects can be used for the physical haptic feedback structures 26, allowing for a broader range of haptic simulation. Additionally, each physical haptic feedback structure 26 can be mapped to multiple virtual targets 46, making it possible to simulate an even greater range of haptic experience. Redirection of the user 24 is key to implementation of the haptic feedback system 12 with as great a variety of haptic simulation as possible.

The following paragraphs provide additional support for the claims of the subject application. One aspect provides a computing system, comprising a head mounted display device including a processor and an associated display; a sensor in communication with the processor, the sensor being configured to detect a movable body part of a user; and a plurality of physical haptic feedback structures configured to be contacted by the movable body part, the structures positioned at different respective positions in real three-dimensional space, the plurality of physical haptic feedback structures including a first structure and a second structure, the first structure having haptic characteristics differentiable from the second structure. The processor may be configured to operate the display device to display a virtual three-dimensional space corresponding to real three-dimensional space; receive from the sensor data indicating a detected location of the movable body part within real three-dimensional space; and operate the display device to display a virtual reality representation of the movable body part, a position of the virtual representation of the movable body part being displayed so as to appear to be positioned in a virtual location within the virtual space corresponding to the detected location in real three-dimensional space. The processor may be configured to determine, from among a plurality of virtual targets in the virtual space and a detected motion of the movable body part, an estimated intended virtual target of the movable body part; determine a target physical structure having haptic characteristics corresponding to the intended virtual target; compute a path in the real three-dimensional space from the movable body part to the target physical structure; compute a spatial warping pattern to warp an image displayed on the display; and display via the display the virtual space and the virtual reality representation according to the spatial warping pattern.

In this aspect, additionally or alternatively, the processor may be configured to determine to which of the plurality of physical haptic feedback structures the movable body part is to be directed based upon at least one parameter selected from the group consisting of a distance between a current location of the movable body part and the target physical structure, an orientation of the target physical structure and the virtual target in the virtual space, and a type of haptic feedback mechanism in the target physical structure.

In this aspect, additionally or alternatively, the spatial warping pattern may be computed to redirect the movable body part along the computed path to the target physical structure and the image warped by the spatial warping pattern may be at least one of the group consisting of an image of the virtual space and an image of the virtual reality representation of the movable body part.

In this aspect, additionally or alternatively, the spatial warping pattern may be computed to redirect the movable body part along the computed path to the target physical structure, and the processor may be further configured to dynamically recalculate the spatial warping pattern in a series of time steps based on dynamic determination of the intended target of the movable body part, therefore causing redirection of the movable body part to the target physical structure to be dynamic and the movable body part to contact the target physical structure concurrently with the virtual reality representation of the movable body part appears to contact the intended virtual target.

In this aspect, additionally or alternatively, the path may be one of a plurality of possible paths to the target physical structure, and computation of the spatial warping pattern may include computing a minimized spatial warping pattern that minimizes an amount by which the image displayed is warped. In this aspect, additionally or alternatively, the processor may be further configured to determine application of the spatial warping pattern based upon a threshold distance between the intended virtual target and the target physical structure.

In this aspect, additionally or alternatively, at least one of the plurality of physical haptic feedback structures may be dynamically mapped to a plurality of virtual targets in the virtual space and the movable body part may be directed to the physical haptic feedback structure based on the determination by the processor, from among the plurality of virtual targets in the virtual space and the detected motion of the movable body part, of the estimated intended virtual target of the movable body part. In this aspect, additionally or alternatively, a dynamic haptic adjustment mechanism may adjust at least a first haptic characteristic of the physical haptic feedback structures, the first haptic characteristic being at least one of the group consisting of applied force, pressure, rotation, rotatability, mechanical resistance, vibration, deformability, elasticity, texture, temperature, electrical charge, electrical resistance, pressure from vented air (non-contact), and emitted ultrasound (non-contact).

In this aspect, additionally or alternatively, the target physical structure may be from the group consisting of a handle, a dial, a knob, a button, a switch, a toggle, a wheel, a lever, a pedal, a pull, a key, and a joystick. In this aspect, additionally or alternatively, the physical haptic feedback structures may include a first surface and a second surface formed as regions on a continuous surface of a base material.

Another aspect provides a method for use with a computing device, comprising, at a processor, operating a head mounted display device including a processor and an associated display to display a virtual three-dimensional space corresponding to real three-dimensional space, the display device including a sensor in communication with the processor, the sensor being configured to detect a movable body part of a user; receiving from the sensor data indicating a detected location of the movable body part within real three-dimensional space; operating the display device to display a virtual reality representation of the movable body part, a position of the virtual representation of the movable body part being displayed so as to appear to be positioned in a virtual location within the virtual space corresponding to the detected location in real three-dimensional space; determining from among a plurality of virtual targets in the virtual space and a detected motion of the movable body part, an estimated intended virtual target of the movable body part; determining a target physical structure having haptic characteristics corresponding to the intended virtual target, the target physical structure being selected from among a plurality of physical haptic feedback structures configured to be contacted by the movable body part, the structures positioned at different respective positions in real three-dimensional space, the plurality of physical haptic feedback structures including a first structure and a second structure, the first structure having haptic characteristics differentiable from the second structure; computing a path in the real three-dimensional space from the movable body part to the target physical structure; computing a spatial warping pattern to warp an image displayed on the display; and displaying via the display the virtual space and the virtual reality representation according to the spatial warping pattern.

In this aspect, additionally or alternatively, the processor may be configured to determine to which of the plurality of physical haptic feedback structures the movable body part is to be directed based upon at least one parameter selected from the group consisting of a distance between a current location of the movable body part and the target physical structure, an orientation of the target physical structure and the virtual target in the virtual space, and a type of haptic feedback mechanism in the target physical structure.

In this aspect, additionally or alternatively, the spatial warping pattern may be computed to redirect the movable body part along the computed path to the target physical structure and the image warped by the spatial warping pattern may be at least one of the group consisting of an image of the virtual space and an image of the virtual reality representation of the movable body part.

In this aspect, additionally or alternatively, the spatial warping pattern may be computed to redirect the movable body part along the computed path to the target physical structure, and the processor may be further configured to dynamically recalculate the spatial warping pattern in a series of time steps based on dynamic determination of the intended target of the movable body part, therefore causing redirection of the movable body part to the target physical structure to be dynamic and the movable body part to contact the target physical structure concurrently with the virtual reality representation of the movable body part appears to contact the intended virtual target.

In this aspect, additionally or alternatively, the path may be one of a plurality of possible paths to the target physical structure, and computation of the spatial warping pattern may include computing a minimized spatial warping pattern that minimizes an amount by which the image displayed is warped. In this aspect, additionally or alternatively, the processor may be further configured to determine application of the spatial warping pattern based upon a threshold distance between the intended virtual target and the target physical structure.

In this aspect, additionally or alternatively, at least one of the plurality of physical haptic feedback structures may be dynamically mapped to a plurality of virtual targets in the virtual space and the movable body part may be directed to the physical haptic feedback structure based on the determination by the processor, from among the plurality of virtual targets in the virtual space and the detected motion of the movable body part, of the estimated intended virtual target of the movable body part. In this aspect, additionally or alternatively, a dynamic haptic adjustment mechanism may adjust at least a first haptic characteristic of the physical haptic feedback structures, the first haptic characteristic being at least one of the group consisting of applied force, pressure, rotation, rotatability, mechanical resistance, vibration, deformability, elasticity, texture, temperature, electrical charge, electrical resistance, pressure from vented air (non-contact), and emitted ultrasound (non-contact). In this aspect, additionally or alternatively, the physical haptic feedback structures may include a first surface and a second surface formed as regions on a continuous surface of a base material.

Another aspect provides a computing system, comprising a head mounted display device including a processor and an associated display; a sensor in communication with the processor, the sensor being configured to detect a movable physical object under direct control of a user; and a plurality of physical haptic feedback structures configured to be contacted by the movable object, the structures positioned at different respective positions in a real three-dimensional space, the plurality of physical haptic feedback structures including a first structure and a second structure, the first structure having haptic characteristics differentiable from the second structure. The processor may be configured to operate the display device to display a virtual three-dimensional space corresponding to real three-dimensional space; receive from the sensor data indicating a detected location of the movable object within real three-dimensional space; operate the display device to display a virtual reality representation of the movable object, a position of the virtual representation of the movable object being displayed so as to appear to be positioned in a virtual location within the virtual space corresponding to the detected location in real three-dimensional space; determine, from among a plurality of virtual targets in the virtual space and a detected motion of the movable object, an estimated intended virtual target of the movable object; determine a target physical structure having haptic characteristics corresponding to the intended virtual target; compute a path in the real three-dimensional space from the movable object to the target physical structure; compute a spatial warping pattern to warp an image displayed on the display; and display via the display the virtual space and the virtual reality representation according to the spatial warping pattern.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
   a head mounted display device including a processor and an associated display;
   a sensor in communication with the processor, the sensor being configured to detect a movable body part of a user; and
   a plurality of physical haptic feedback structures configured to be contacted by the movable body part, the physical haptic feedback structures having physical haptic characteristics that are differentiable from each other and positioned at different respective positions in real three-dimensional space;
   the processor configured to:
      operate the display device to display a virtual three-dimensional space corresponding to real three-dimensional space;
      receive from the sensor data indicating a detected location of the movable body part within real three-dimensional space;
      operate the display device to display a virtual reality representation of the movable body part, a position of the virtual reality representation of the movable body part being displayed so as to appear to be positioned in a virtual location within the virtual space corresponding to the detected location in real three-dimensional space;
      determine, from among a plurality of virtual targets in the virtual space and a detected motion of the movable body part, an estimated intended virtual target of the movable body part;
      determine a score for each of the plurality of physical haptic feedback structures based on the physical haptic characteristics and the position of each of the physical haptic feedback structures with respect to the estimated intended virtual target;
      determine a target physical haptic feedback structure from among the plurality of physical haptic feedback structures based on a comparison of the scores calculated for the plurality of physical haptic feedback structures;
      compute a path in the real three-dimensional space from the movable body part to the target physical haptic feedback structure;
      compute a spatial warping pattern to warp an image displayed on the display based on the computed path; and
      display via the display the virtual space and the virtual reality representation according to the spatial warping pattern in order to redirect the movable body part along the computed path from the estimated intended virtual target to the target physical haptic feedback structure.

2. The system of claim 1, wherein the processor is configured to determine to which of the plurality of physical haptic feedback structures the movable body part is to be directed based upon at least one parameter selected from the group consisting of a distance between a current location of the movable body part and the target physical haptic feedback structure, an orientation of the target physical haptic feedback structure and the virtual target in the virtual space, and a type of haptic feedback mechanism in the target physical haptic feedback structure.

3. The system of claim 1, wherein the spatial warping pattern is computed to redirect the movable body part along the computed path to the target physical haptic feedback structure and the image warped by the spatial warping pattern is at least one of the group consisting of an image of the virtual space and an image of the virtual reality representation of the movable body part.

4. The system of claim 1, wherein the spatial warping pattern is computed to redirect the movable body part along the computed path to the target physical haptic feedback structure, and wherein the processor is further configured to dynamically recalculate the spatial warping pattern in a series of time steps based on dynamic determination of the estimated intended virtual target of the movable body part, therefore causing redirection of the movable body part to the target physical haptic feedback structure to be dynamic and the movable body part to contact the target physical haptic feedback structure concurrently with the virtual reality representation of the movable body part appears to contact the estimated intended virtual target.

5. The system of claim 4, wherein the path is one of a plurality of possible paths to the target physical haptic feedback structure, and wherein computation of the spatial warping pattern includes computing a minimized spatial warping pattern that minimizes an amount by which the image displayed is warped.

6. The system of claim 1, wherein the processor is further configured to determine application of the spatial warping pattern based upon a threshold distance between the estimated intended virtual target and the target physical haptic feedback structure.

7. The system of claim 1, wherein at least one of the plurality of physical haptic feedback structures is dynamically mapped to the plurality of virtual targets in the virtual space and the movable body part is directed to the target physical haptic feedback structure based on the determination by the processor, from among the plurality of virtual targets in the virtual space and the detected motion of the movable body part, of the estimated intended virtual target of the movable body part.

8. The system of claim 1, further comprising a dynamic haptic adjustment mechanism that adjusts at least a first haptic characteristic of the physical haptic feedback structures, the first haptic characteristic being at least one of the group consisting of applied force, pressure, rotation, rotatability, mechanical resistance, vibration, deformability, elasticity, texture, temperature, electrical charge, electrical resistance, pressure from vented air (non-contact), and emitted ultrasound (non-contact).

9. The system of claim 1, wherein the target physical haptic feedback structure is selected from the group consisting of a handle, a dial, a knob, a button, a switch, a toggle, a wheel, a lever, a pedal, a pull, a key, and a joystick.

10. The system of claim 1, wherein the physical haptic feedback structures include a first surface and a second surface formed as regions on a continuous surface of a base material.

11. A method for use with a computing device, comprising:
at a processor:
operating a head mounted display device and an associated display to display a virtual three-dimensional space corresponding to real three-dimensional space, the display device including a sensor in communication with the processor, the sensor being configured to detect a movable body part of a user;
receiving from the sensor data indicating a detected location of the movable body part within real three-dimensional space;
operating the display device to display a virtual reality representation of the movable body part, a position of the virtual reality representation of the movable body part being displayed so as to appear to be positioned in a virtual location within the virtual space corresponding to the detected location in real three-dimensional space;
determining, from among a plurality of virtual targets in the virtual space and a detected motion of the movable body part, an estimated intended virtual target of the movable body part;
determining a score for each of a plurality of physical haptic feedback structures based on physical haptic characteristics of each of the physical haptic feedback structures and the position of each of the physical haptic feedback structures with respect to the estimated intended virtual target;
determining a target physical haptic feedback structure from among the plurality of physical haptic feedback structures based on a comparison of the scores calculated for the plurality of physical haptic feedback structures, the target physical haptic feedback structure being selected from among the plurality of physical haptic feedback structures configured to be contacted by the movable body part, the physical haptic feedback structures having physical haptic characteristics that are differentiable from each other and positioned at different respective positions in real three-dimensional space;
computing a path in the real three-dimensional space from the movable body part to the target physical haptic feedback structure;
computing a spatial warping pattern to warp an image displayed on the display based on the computed path; and
displaying via the display the virtual space and the virtual reality representation according to the spatial warping pattern in order to redirect the movable body part along the computed path from the estimated intended virtual target to the target physical haptic feedback structure.

12. The method of claim 11, wherein the processor is configured to determine to which of the plurality of physical haptic feedback structures the movable body part is to be directed based upon at least one parameter selected from the group consisting of a distance between a current location of the movable body part and the target physical haptic feedback structure, an orientation of the target physical haptic feedback structure and the virtual target in the virtual space, and a type of haptic feedback mechanism in the target physical haptic feedback structure.

13. The method of claim 11, wherein the spatial warping pattern is computed to redirect the movable body part along the computed path to the target physical haptic feedback structure and the image warped by the spatial warping pattern is at least one of the group consisting of an image of the virtual space and an image of the virtual reality representation of the movable body part.

14. The method of claim 11, wherein the spatial warping pattern is computed to redirect the movable body part along the computed path to the target physical haptic feedback structure, and wherein the processor is further configured to dynamically recalculate the spatial warping pattern in a series of time steps based on dynamic determination of the estimated intended virtual target of the movable body part, therefore causing redirection of the movable body part to the target physical haptic feedback structure to be dynamic and the movable body part to contact the target physical haptic feedback structure concurrently with the virtual reality representation of the movable body part appears to contact the estimated intended virtual target.

15. The method of claim 14, wherein the path is one of a plurality of possible paths to the target physical haptic feedback structure, and wherein computation of the spatial warping pattern includes computing a minimized spatial warping pattern that minimizes an amount by which the image displayed is warped.

16. The method of claim 11, further comprising, via the processor, determining application of the spatial warping pattern based upon a threshold distance between the estimated intended virtual target and the target physical haptic feedback structure.

17. The method of claim 11, wherein at least one of the plurality of physical haptic feedback structures is dynamically mapped to the plurality of virtual targets in the virtual space and the movable body part is directed to the target physical haptic feedback structure based on the determination by the processor, from among the plurality of virtual targets in the virtual space and the detected motion of the movable body part, of the estimated intended virtual target of the movable body part.

18. The method of claim 11, further comprising adjusting, via a dynamic haptic adjustment mechanism, at least a first haptic characteristic of the physical haptic feedback structures, the first haptic characteristic being at least one of the group consisting of applied force, pressure, rotation, rotatability, mechanical resistance, vibration, deformability, elasticity, texture, temperature, electrical charge, electrical resistance, pressure from vented air (non-contact), and emitted ultrasound (non-contact).

19. The method of claim 11, wherein the physical haptic feedback structures include a first surface and a second surface formed as regions on a continuous surface of a base material.

20. A computing system, comprising:
a head mounted display device including a processor and an associated display;
a sensor in communication with the processor, the sensor being configured to detect a movable physical object under direct control of a user; and
a plurality of physical haptic feedback structures configured to be contacted by the movable object, the physical haptic feedback structures having physical haptic characteristics that are differentiable from each other and positioned at different respective positions in a real three-dimensional space;
the processor configured to:
operate the display device to display a virtual three-dimensional space corresponding to real three-dimensional space;

receive from the sensor data indicating a detected location of the movable object within real three-dimensional space;

operate the display device to display a virtual reality representation of the movable object, a position of the virtual reality representation of the movable object being displayed so as to appear to be positioned in a virtual location within the virtual space corresponding to the detected location in real three-dimensional space;

determine, from among a plurality of virtual targets in the virtual space and a detected motion of the movable object, an estimated intended virtual target of the movable object;

determine a score for each of the plurality of physical haptic feedback structures based on the physical haptic characteristics and the position of each of the physical haptic feedback structures with respect to the estimated intended virtual target;

determine a target physical haptic feedback structure from among the plurality of physical haptic feedback structures based on a comparison of the scores calculated for the plurality of physical haptic feedback structures;

compute a path in the real three-dimensional space from the movable object to the target physical haptic feedback structure;

compute a spatial warping pattern to warp an image displayed on the display based on the computed path; and display via the display the virtual space and the virtual reality representation according to the spatial warping pattern in order to redirect the movable object along the computed path from the estimated intended virtual target to the target physical haptic feedback structure.

* * * * *